(12) United States Patent
Nyström et al.

(10) Patent No.: US 7,616,556 B2
(45) Date of Patent: Nov. 10, 2009

(54) WIRELESS MULTICARRIER SYSTEM WITH SUBCARRIERS RESERVED FOR COMMUNICATION BETWEEN UNSYNCHRONIZED NODES

(75) Inventors: Johan Nyström, Stockholm (SE); Pål Frenger, Vällinby (SE); Erik Dahlman, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 596 days.

(21) Appl. No.: 10/581,995

(22) PCT Filed: Dec. 1, 2004

(86) PCT No.: PCT/EP2004/053193

§ 371 (c)(1),
(2), (4) Date: Jun. 7, 2006

(87) PCT Pub. No.: WO2005/060194

PCT Pub. Date: Jun. 30, 2005

(65) Prior Publication Data

US 2007/0002725 A1    Jan. 4, 2007

(30) Foreign Application Priority Data

Dec. 10, 2003    (EP)    ................................. 03104617

(51) Int. Cl.
*H04J 11/00*    (2006.01)
(52) U.S. Cl. ................. 370/208; 370/328; 370/441
(58) Field of Classification Search ............... 370/208, 370/209, 210, 203, 319, 328, 329, 330, 344, 370/441
See application file for complete search history.

(56) References Cited

U.S. PATENT DOCUMENTS

| | | | |
|---|---|---|---|
| 6,816,452 B1* | 11/2004 | Maehata | 370/208 |
| 6,985,433 B1* | 1/2006 | Laroia et al. | 370/208 |
| 7,269,151 B2* | 9/2007 | Diener et al. | 370/329 |
| 2002/0159426 A1* | 10/2002 | Kanemoto et al. | 370/342 |
| 2003/0142621 A1* | 7/2003 | Uesugi | 370/203 |
| 2003/0162547 A1* | 8/2003 | McNair | 455/456 |
| 2007/0183308 A1* | 8/2007 | Korobkov et al. | 370/208 |

(Continued)

OTHER PUBLICATIONS

Kapoor et al, Pilot Assisted Synchronization for Wireless OFDM Systems Over Fast Time Varying Fading Channels, XP-000903385. IEEE, VTC May 18, 1998, pp. 2077-2080.

(Continued)

*Primary Examiner*—Chi H. Pham
*Assistant Examiner*—Kevin Mew
(74) *Attorney, Agent, or Firm*—Nixon & Vanderhye P.C.

(57) ABSTRACT

In a system applying orthogonal frequency division multiplexing, OFDM, a number of carriers are reserved for communication between unsynchronized nodes (N1, N2). At least one such reserved carrier is assigned to each base station. A sinusoidal signal is transmitted on this reserved carrier during a time period at least equal to two consecutive OFDM symbols. The unsynchronized receiver detects the sinusoidal signal during one of two consecutive OFDM symbol time periods. The existence, the frequency and the signal power of the signal give information about the existence and identity of the transmitter. Also, estimates of relative velocities and distances can be deduced. In preferred embodiments, the sinusoidal signal can also be used to transmit further information by using signal modulation or coding that is independent of the absolute signal phase.

34 Claims, 10 Drawing Sheets

U.S. PATENT DOCUMENTS

| | | | |
|---|---|---|---|
| 2008/0043611 A1* | 2/2008 | Geile et al. | 370/208 |
| 2008/0049599 A1* | 2/2008 | Dapper et al. | 370/208 |
| 2008/0095121 A1* | 4/2008 | Shattil | 370/335 |
| 2008/0130790 A1* | 6/2008 | Forenza et al. | 375/299 |

OTHER PUBLICATIONS

Engström et al., A System for Test of Multiaccess Methods based on OFDM, XP-000497744, IEEE, Jun. 8, 1994, pp. 1843-1845.

International Search Report for PCT/EP2004/053193 dated Feb. 25, 2005.

Kapoor et al., *Pilot Assisted Synchronization for Wireless OFDM Systems over Fast Time Varying Fading Channels*, 48$^{th}$ IEEE Vehicular Technology Conference, vol. 3, Conf. 48, May 18, 1998, pp. 2077-2080, XP000903385.

Engstrom et al., *A System for Test of Multiaccess Methods Based on OFDM*, Proceedings of the Vehicular Technology Conference, vol. 3, Conf. 44, Jun. 8, 1994, pp. 1843-1845, XP000497744.

* cited by examiner

| BST FREQ. | 1 | 2 | 3 | 4 | 5 | 6 | 7 | 8 | ... |
|---|---|---|---|---|---|---|---|---|---|
| 1 | × |   |   |   |   |   |   |   |   |
| 2 |   |   |   |   | × |   |   |   |   |
| 3 |   | × |   |   |   |   |   |   |   |
| 4 |   |   | × |   |   |   |   |   |   |
| 5 | × |   |   |   |   |   |   |   |   |
| 6 |   | × |   |   |   |   |   |   |   |
| 7 |   |   |   |   |   | × |   |   |   |
| 8 |   |   |   |   |   | × |   |   |   |

WIRELESS MULTICARRIER SYSTEM WITH SUBCARRIERS RESERVED FOR COMMUNICATION BETWEEN UNSYNCHRONIZED NODES

This application is the US national phase of international application PCT/EP2004/053193 filed 1 Dec. 2004, which designated the U.S. and claims priority to EP 03104617.0 filed 10 Dec. 2003, the entire contents of each of which are hereby incorporated by reference.

TECHNICAL FIELD

The present invention relates in general to signaling in multi-carrier systems and in particular to communication between unsynchronised nodes in such a system.

BACKGROUND

The basic concept of cellular communication system involves the principle that a mobile terminal should be able to change base station, preferably without disturbing any ongoing traffic. The mobile thus has the need to be able to find different base stations to communicate with. Since the mobile terminals may move around, there has to be a continuous, or at least frequently intermittent, search for the existence of other base stations within communication distance. In case the signal strength of the base station with which the mobile terminal currently communicates is weakened significantly, it might be beneficial to perform a handover to another base station with higher signal strength or better signal-to-noise ratio.

In a communication system that uses Orthogonal Frequency Division Multiplexing (OFDM), the data is sent in parallel over several carriers. Since the data is transmitted in parallel, the time duration of each OFDM symbol can be made much longer than the length of the time dispersion of the radio channel. To further increase the robustness a cyclic extension, or a Cyclic Prefix (CP), is usually inserted. As long as the length of the CP is longer than the length of the channel impulse response there will be no Inter-Symbol Interference (ISI) in the OFDM system.

In order for the mobile to be able to receive data from a base station using OFDM for downlink transmission, the mobile must be time-synchronised to the base station. The mobile needs to know the beginning of the useful symbol duration. In a cellular system with unsynchronised base stations, the timing of different base stations may drift and a mobile can not easily detect any data sent from another base station with a different time synchronisation.

In order to initiate a handover, the mobile needs to detect the existence of at least a second base station within communication distance. The mobile also needs to know some identity number, or cell ID, of this second base station. If the mobile is unsynchronised to the second base station, then the mobile has to search for signals that might originate from a second base station. The mobile has to assume a preliminary time synchronisation and determine if there is any meaningful information available when using such a time synchronisation. In case the information is un-interpretable, the preliminary time synchronisation has to be changed and a new evaluation of any meaningful information is performed. Such matching between expected and received signal patterns is performed for a number of possible base stations. This procedure is demanding in terms of processing power, and thereby also in terms of battery resources of the mobile station. Furthermore, in a typical case, such a process will also take a considerable time, during which the call may be lost due to the weak present connection.

SUMMARY

A problem with prior art devices and methods using OFDM is that there are no easily available possibilities to communicate with or even receiving broadcast information from unsynchronised nodes. Further problems are that procedures for achieving a synchronisation are slow, they demand high processing power, and they require considerable battery power.

An object is to provide methods and devices for enabling a communication between unsynchronised nodes within an OFDM scheme without too high demands in terms of computational and electric power. A further object is to achieve methods and devices for broadcasting of information between unsynchronised nodes.

The above objects are achieved by methods and devices according to the enclosed patent claims. In general words, a number of carriers used by the OFDM system are reserved for communication between unsynchronised nodes. At least one such reserved carrier is assigned to each base station. A sinusoidal signal is transmitted on this reserved carrier during a time period corresponding to at least two consecutive OFDM symbols. The unsynchronised receiver detects the sinusoidal signal during one of two consecutive OFDM symbol time periods. The existence, the frequency and the signal power of the signal give information about the existence and identity of the transmitter. Also, estimates of relative velocities and distances can be deduced. In preferred embodiments, the sinusoidal signal can also be used to transmit further information by using signal modulation or coding that is independent of the absolute signal phase. The amplitude of the sinusoidal signal can be used to represent different data, in particular by switching the sinusoidal signal on and off. Furthermore, coding using only relative signal phases between signals can be used, e.g. DPSK (Differential Phase Shift Keying).

Since the above technique gives possibilities for information exchange without being perfectly synchronised, such signaling can advantageously be used for purposes of e.g. searching for base stations during handover attempts, or broadcasting during paging procedures. The present technology significantly reduces the computational and power demands during cell search and idle mode. Furthermore, the times for executing handover or for connecting to a base station will be significantly reduced.

BRIEF DESCRIPTION OF THE DRAWINGS

The invention, together with further objects and advantages thereof, may best be understood by making reference to the following description taken together with the accompanying drawings, in which:

FIG. 8B is a diagram illustrating the transmission and reception of OFDM signals between unsynchronised nodes according to prior art;

DETAILED DESCRIPTION

Figure 1A:
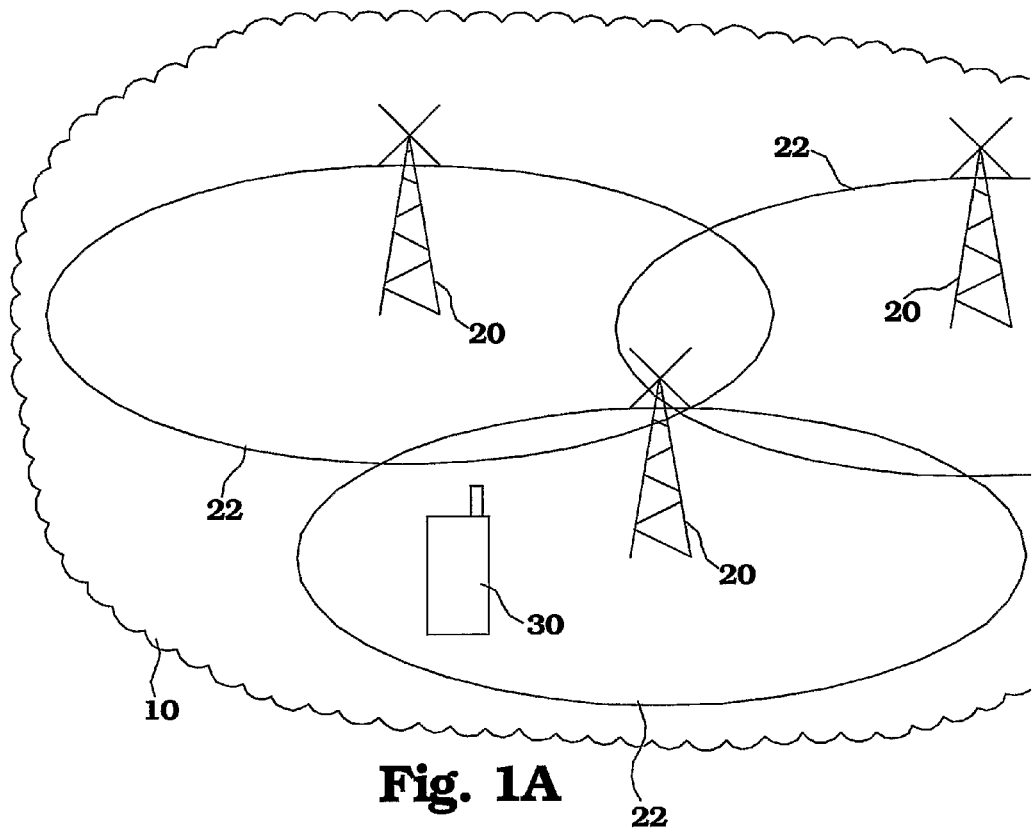
FIG. 1A is a schematic illustration of a mobile communications network.

In FIG. 1, a general mobile communications network 10 is schematically illustrated. A number of base stations 20 are connected in a (not shown) network. A mobile terminal 30 is movable within the coverage area of the mobile communications network 10 and communicates therewith through one of the base stations 20. Each base station 20 is associated with a cell 22, in which it typically is the main choice for handle mobile terminal 30 connections to the mobile communications network 10.

In the present disclosures, the exemplifying embodiments are based on a particular multi-carrier system, namely an OFDM system. However, the invention is also applicable to other multi-carrier wireless communications systems. Non-exclusive examples of other communications systems, in which the present invention is advantageously applicable, are IFDMA (Interleaved Frequency Division Multiple Access) systems, non-orthogonal or bi-orthogonal multi-carrier systems.

OFDM is a robust technique for transmitting large data quantities. The technique is mainly used for DownLink (DL) communication, i.e. from a base station to a mobile terminal, but may also be applied to UpLink (UL) communication, i.e. from a mobile terminal to a base station. First, some important aspects of the OFDM technique as such is discussed, in order to give a basis, from which the benefits of the present invention is easily understood.

Figure 1B:
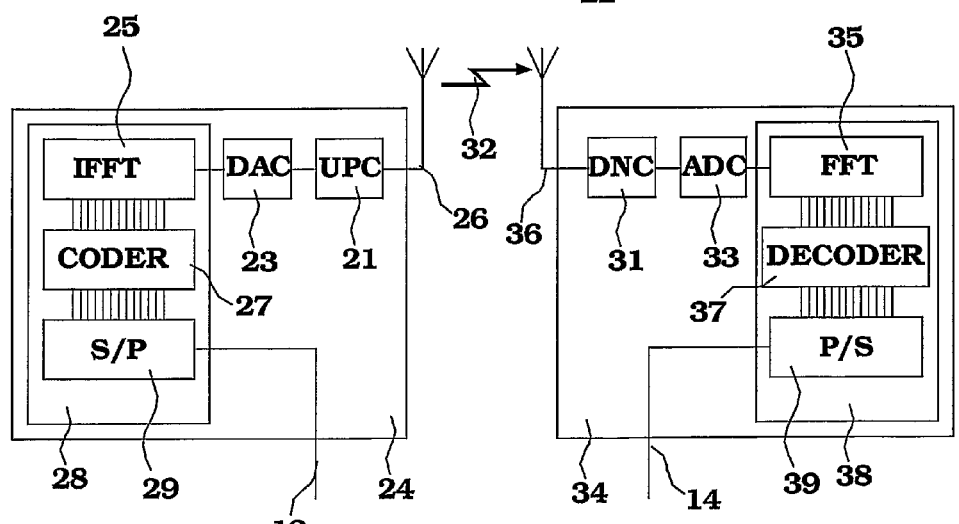
FIG. 1B is a block diagram of a transmitter and receiver in a prior art OFDM system.

OFDM uses simultaneous transmission on a (large) number of orthogonal frequencies. FIG. 1B illustrates a typical prior-art OFDM transmitter-receiver pair. A transmitter 24 transmits signals 32 comprising the orthogonal frequencies by an antenna 26 and a receiver 34 receives the signals 32 by an antenna 36. An OFDM transmitter 24 can be efficiently implemented by an Inverse Fast Fourier Transform (IFFT) 25. The original signal to be transmitted is received on an input 12 of the transmitter 24. A signal processor 28 receives the input signal. A serial-to-parallel converter 29 selects a number n of serial data values and converts them into n parallel data values with a time duration expanded n times. The n parallel data are coded in parallel in an encoder 27, and the IFFT 25 is thus provided with n encoded data values. The IFFT creates a signal comprising n different frequencies with Fourier coefficients according to the n encoded data values. The signal is converted into an analogue form by a Digital-to-Analogue Converter (DAC) 23 and is finally upconverted to the transmission frequency by an upconverter unit 21. The signal to be sent is then provided to the antenna 26.

The encoder 27 and serial-to-parallel converter 29 may, as anyone skilled in the art knows, also be placed in an opposite order. The encoder 27 is in such a case a serial encoder.

The OFDM receiver 34 can in an analogous manner be implemented by a Fast Fourier Transform (FFT 35. A signal 32 is received by the antenna 36. A downconverter unit 31 converts the signal down to the base frequencies, and an Analogue-to-Digital Converter (ADC) 33 converts the signal into a digital form. The digital signal is provided to a signal processor 38. The FFT 35 transforms the input signal into a number n of Fourier coefficients representing the signal. The n coefficients are forwarded to a decoder 37, which decodes the n coefficients in parallel into n data values. Finally, a parallel-to-serial converter 39 puts the n data values back into a serial relationship, and these serial data values are provided as an output signal on a receiver output 14.

Also here, the decoder 37 and the parallel-to-serial converter 39 may be placed in the opposite order in analogy with the transmitter side.

Figure 2:
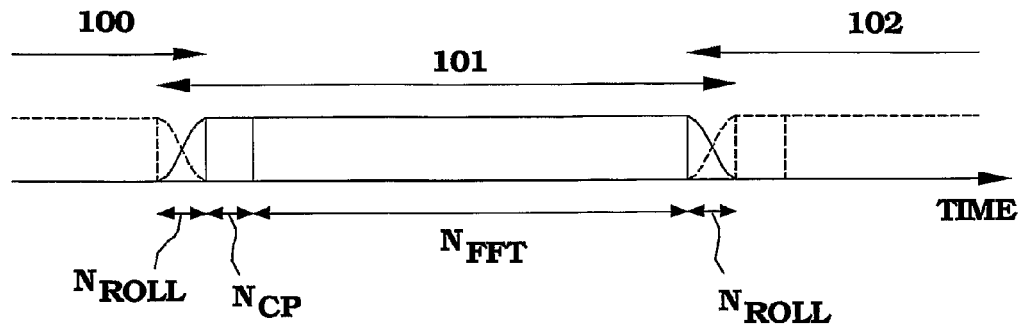
FIG. 2 is a diagram illustrating the timing of OFDM signaling.

An OFDM signal has a certain time duration, often called the OFDM symbol length. In FIG. 2, the timing of OFDM signalling is illustrated in a discrete time domain plot. An OFDM modulated symbol 101 comprises a useful symbol duration of $N_{ft}$ samples. As mentioned above, a CP of length $N_{cp}$ is usually inserted to prohibit ISI. The cyclic extension can be placed in front of or after the useful symbol duration. The notation cyclic prefix is used when the cyclic extension is placed before the useful symbol duration and the notation cyclic suffix is often used when the cyclic extension is placed after the useful symbol duration. The description here assumes that a cyclic prefix is used and not a cyclic suffix, but it is obvious for anyone skilled in the art that the cyclic extension may just as well be placed after the useful symbol duration or that cyclic extensions may be used both before and after the useful symbol duration. In the exemplifying embodiments of the present disclosure, it will be illustrated as preceding the useful data symbols, but this should not limit the scope of protection of the present invention.

A minor drawback with an OFDM symbol together with its CP is that each carrier will give rise to large spectral side lobes. To reduce the spectral side lobes, a roll-on extension with $N_{roll}$ samples and a roll-off extension with $N_{roll}$ samples may be added as well. The roll-on and roll-off shape can typically be selected as a raised cosine shape. The roll-on extension is typically arranged to overlap with the roll-off extension of a previous OFDM symbol 100 and obviously, the roll-off extension is therefore arranged to overlap with the roll-on extension of a following OFDM symbol 102. In order to have a constant transmitted power over time it is necessary that the power increase in the roll-on section of the current OFDM symbol 101 exactly matches the power decrease in the roll-off section in the previous OFDM symbol 100. This can be expressed as a requirement on the windowing function that the roll-off window shall be equal to one minus the roll-off window. This is a property that many window shapes have, e.g. the raised cosine shaping.

In FIG. 2, the useful part of the OFDM symbol 101 seems to be reduced significantly by the CP and roll-on/roll-off portions. However, FIG. 2 is only used to visualise the basic principles. In typical operating conditions, the duration of $N_{fft}$ is much larger than the sum of duration for CP and roll-on/roll-off. The loss in transfer capacity caused by these additional portions is normally just marginal.

Figure 3:
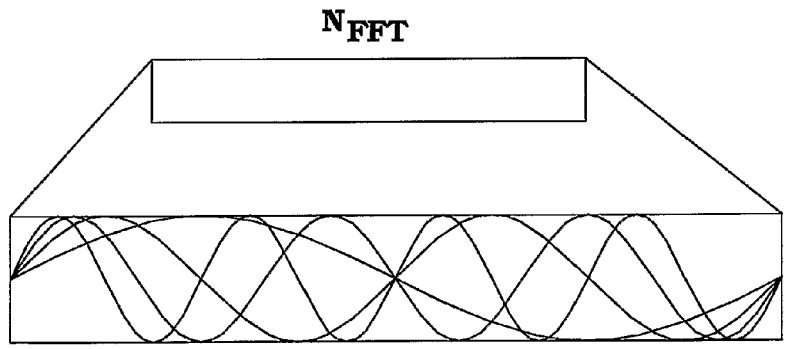
FIG. 3 is a diagram illustrating orthogonal carriers during the useful part of an OFDM symbol.

In FIG. 3, a number of OFDM carriers are illustrated within the useful symbol duration $N_{fft}$. Anyone skilled in the art realises that all carriers rotate an integer number of times during the useful symbol duration of $N_{fft}$ samples. Also note that in general the carriers are represented in the complex base band, but in FIG. 3 only the sine part of the carrier is seen and not the cosine part. This means, for instance, that the phase of a carrier reaches the same values at the beginning and the end of the useful symbol duration $N_{fft}$.

Figure 4:
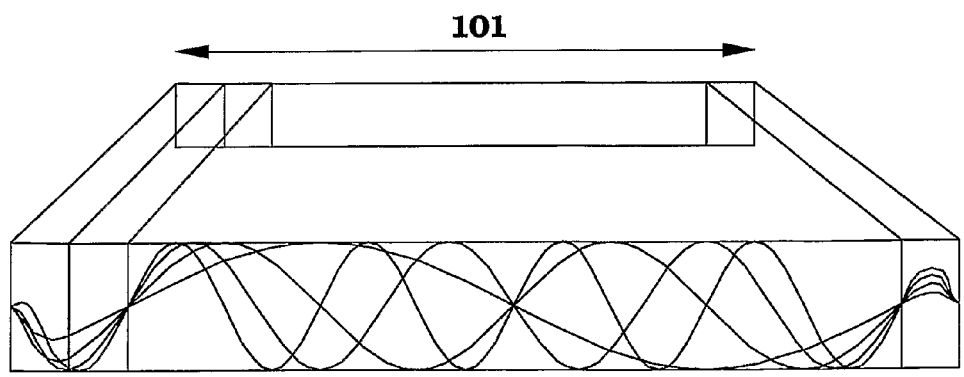
FIG. 4 is a diagram illustrating orthogonal carriers during the entire duration of an OFDM symbol.

In FIG. 4, a number of OFDM carriers are illustrated within an entire OFDM symbol length. One now realises that the carriers in general do not rotate an integer number of times during the total number of $N_{fft}+N_{cp}$ samples. There may be a few exceptions, where the relative size between $N_{fft}$ and $N_{cp}$ happens to match, where the carriers do rotate an integer number of times. When the roll-on and roll-off sections are added, the signal from a single OFDM symbol is no longer even constant in amplitude over the total of $N_{fft}+N_{cp}+2N_{roll}$ samples.

Figure 5:
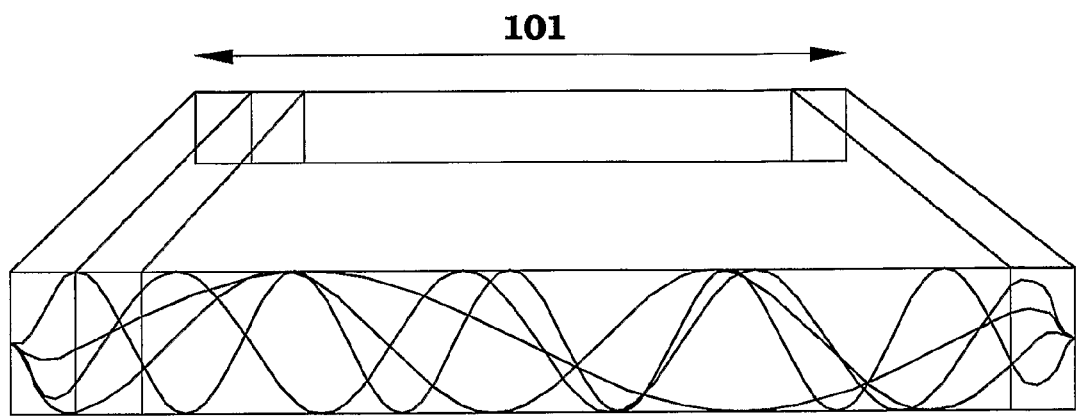
FIG. 5 is a diagram illustrating orthogonal phase shifted carriers during the entire of an OFDM symbol.

The phase of the carriers is used as information carrier in an OFDM system. In the previous figures, all carriers were illustrated having the same phase shift at the onset of the useful symbol duration of $N_{fft}$ samples. However, a more realistic could be the one illustrated in FIG. 5, where different carrier presents different phase shifts.

Figure 6:
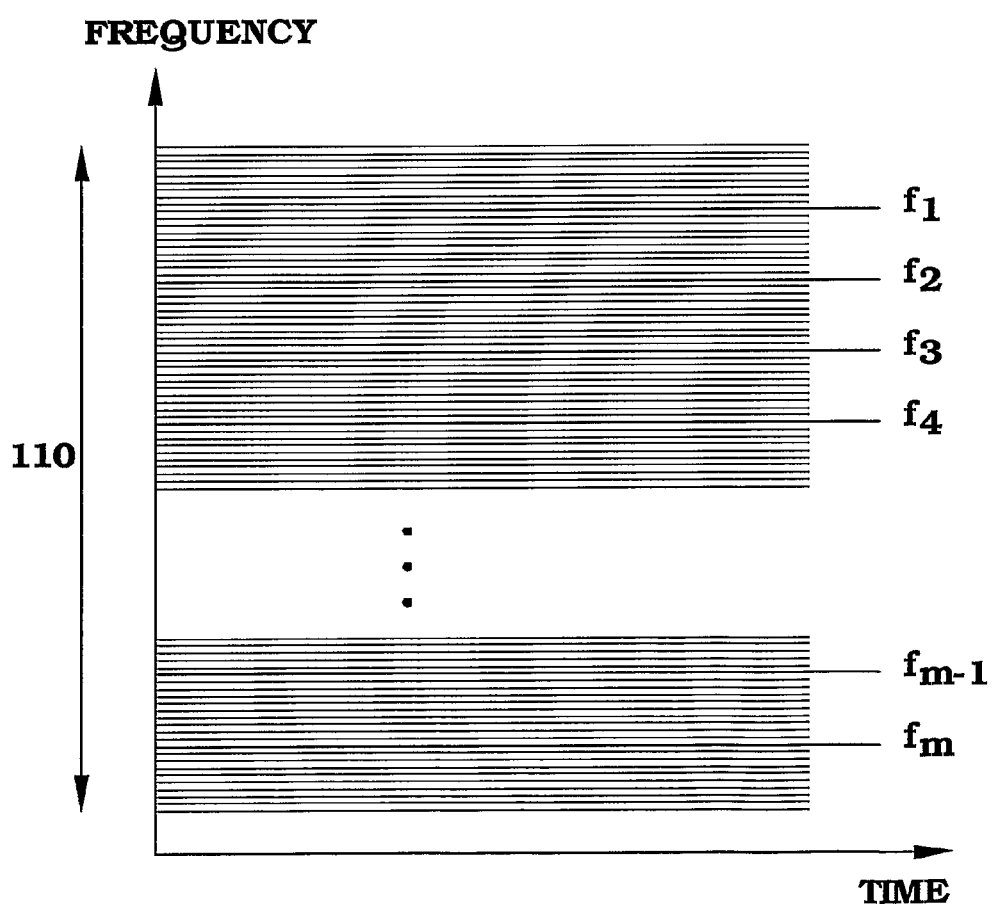
FIG. 6 is a diagram illustrating carriers of an OFDM system and such carriers reserved for unsynchronised communication.

FIG. 6 illustrates an example carrier utilisation for OFDM. In a typical OFDM system, a large number of carriers are used. In a typical system, 4000 carriers could be in use, spread over a frequency range 110. The carriers are equidistant, i.e., there is a constant frequency difference between two successive carriers.

A new channel is introduced that fits into the OFDM framework, which is dedicated to transmission of information between nodes that are not necessarily time-synchronised. In a basic example embodiment, a sub-set $f_1, f_2, \ldots, f_m$ of carriers is reserved for transmitting such information. Preferably, the sub-set is also equidistant in frequency, i.e., each carrier in the sub-set is separated from the previous carrier in the sub-set by the same frequency difference.

Figure 7:
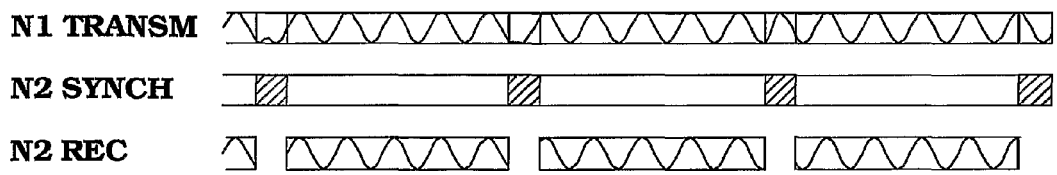
FIG. 7 is a diagram illustrating the association between frequencies of reserved carriers and node identity.

Each base station is assigned a set of such reserved frequencies, thereby creating a relation between reserved frequencies and base station identity. The very existence of a certain carrier or set of carriers of the reserved sub-set can therefore be associated with a certain base station. Since the total number of carriers is very large, typically several thousands. The use of a hundred of them for unsynchronised communication will not influence the data transfer efficiency more than marginally. FIG. 7 schematically illustrates the association between certain carrier frequencies and base stations (BST). This associative information is available within the communications network.

Figure 8A:
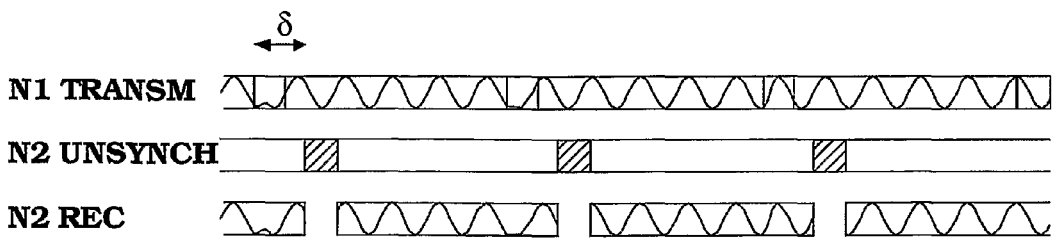
FIG. 8A is a diagram illustrating the transmission and reception of OFDM signals between synchronised nodes.

The ordinary information transfer in OFDM is as mentioned above based on the phase information of each carrier. This requires a good synchronisation between transmitter and receiver. When the transmitter and receiver are synchronised, the data transfer is performed as schematically illustrated in FIG. 8A. A transmitter of a first node N1 creates a number of orthogonal carriers with phase shifts according to data values to be transmitted. CP and roll-on/roll-off sections are added and a signal is transmitted. In FIG. 8A the upper part illustrates such a transmitted signal. In order to represent the signal, a single carrier is illustrated, although a multitude of carriers are transmitted simultaneously. The start and end of roll-on/roll-off and CP sections are indicated by vertical lines. One realises that the signal is a pure sinusoidal signal, except for the roll-on/roll off and CP sections.

A second node N2 receives the signal. The node N2 is synchronised with the node N1, which means that N2 will neglect signal information achieved in periods corresponding to CP and roll-on/roll-off sections. A template in time dimension is created, as indicated in the middle row of FIG. 8A. Signals arriving during the barred intervals are neglected and only signals arriving between these barred intervals are used for analysis. The signal received by the node N2 is indicated in the lower part of FIG. 8A. These signals are pure sinusoidal signals with exactly the same phase shifts as the original ones. An evaluation of the phase shifts then leads to an interpretation of the transferred information.

In FIG. 8B, a similar situation is described. However, in this case the nodes N1 and N2 are not synchronised. The upper part is identical to FIG. 8A since the first node operates in a similar timing as before. The time reference of node N2 is, however, now offset a time δ. This means that the time template of node N2 is also offset the difference δ as shown in the middle part of FIG. 8B. The resulting signals extracted by node N2 is shown in the lower part of FIG. 8b. It is obvious for anyone skilled in the art that this signal is not a pure sinusoidal signal, which means that the signal also contains components of other frequencies. Since all carriers are distorted in a similar manner, the resulting signal will be severely distorted and any attempts to interpret the informational content will fail. This is the prior-art situation for communication between unsynchronised nodes.

Figure 8C:
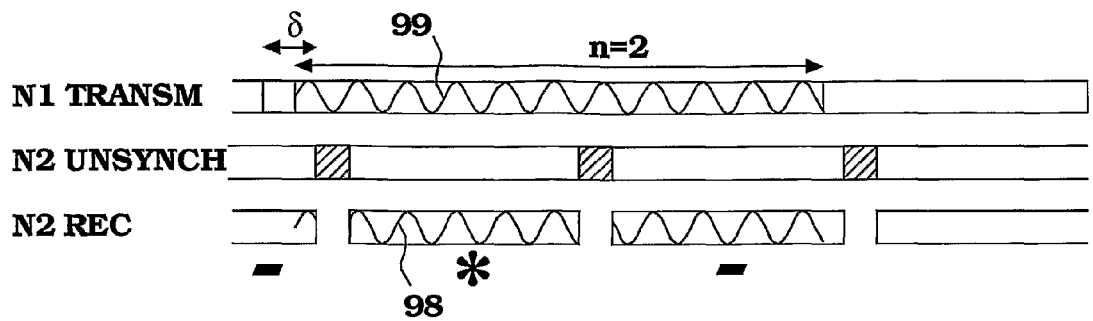
FIGS. 8C and 8D are diagrams illustrating the transmission and reception of sinusoidal signals between unsynchronised nodes according to example embodiments.

FIG. 8C illustrates the signalling principles between unsynchronised nodes according to an example embodiment. The node N1 transmits on a carrier reserved for unsynchronised communication that is assigned to node N1. A sinusoidal signal 99 is transmitted during at least a time period corresponding to two consecutive OFDM symbols. In the present embodiment, the length corresponds to two OFDM symbols, as indicated by the arrow and reference "n=2". This sinusoidal signal 99 is continuously transmitted, regardless of any normal roll-on/roll-off or CP sections. The node N2 is unsynchronised with node N1 as in FIG. 8B, by a time reference difference of δ. The time template of node N2 is as illustrated in the middle of the figure. At the lower part of FIG. 8C the received or extracted signal is illustrated. The first extracted OFDM symbol, of which only a part is seen in the figure, contains un-interpretable information. A minus sign ("−") indicates this useless signal in the figure. However, a second extracted OFDM signal 98 does only contain one single sinusoidal frequency. This OFDM symbol can therefore be associated with useful information, which is indicated with a star ("*"). The third extracted OFDM signal again contains non-sinusoidal components at the end of the OFDM signal period and any information of this symbol is of no use.

In this way, it is understood that by sending a pure sinusoidal signal 99 during two OFDM symbol lengths at a time, every second received OFDM symbol 98 has some sort of informational value. One realises that the phase of the received signal still is not to trust, since the time reference difference δ, is unknown. However, modulation techniques using pure sinusoidal signals 99 but no absolute phases are possible to use for transferring information.

Figure 8D:
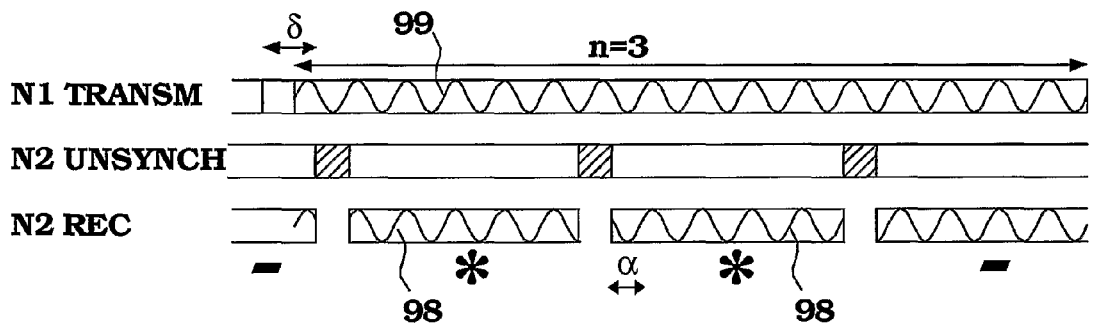

In FIG. 8D, an alternative example embodiment is illustrated. Here, the duration of the pure sinusoidal signal 99 transmitted from node N1 corresponds to three successive OFDM symbols. The received and extracted OFDM symbols comprise one nonsense symbol and two symbols comprising pure sinusoidal signals 98. The frequency of these two sinusoidal signals 98 is identical. However, there is a relative phase shift α, which uniquely depends on, and therefore can be calculated from, the relation between the absolute frequency and the magnitude of the CP and roll-on/roll-off durations. It is thus easily concluded if the two detected sinusoidal signals 98 originates from the same transmitted sinusoidal signal 99.

The mere existence of sinusoidal signals 98 can be utilised. As mentioned before, each base station is assigned a set of reserved frequencies. The mobile terminal can then listen and try to detect the presence or existence of an un-modulated sinusoid signal 98 that belongs to the reserved set of frequencies. When the mobile detects the presence of a signal on a frequency reserved for unsynchronised communication, it can extract at least the following 4 items of information.

The cell ID of the base station transmitting the reserved frequency (or frequencies) is a direct mapping of the frequency (or frequencies) used. By using e.g. a table similar to the one illustrated in FIG. 7, the existence of a certain reserved frequency directly leads to the knowledge that a specific one of the base stations is present relatively close.

The relative path loss to the new unsynchronised base station is derived from averaging the received signal strength of the reserved signal. The relative path loss then gives information about approximate distances or whether the new base station may be a handover alternative.

By measuring any minor frequency shifts between the actual measured or detected frequency and an expected frequency of the reserved signal of the identified base station, a relative Doppler to the new base station as compared to the present base station is derived. An absolute Doppler estimation is achieved by comparing the received frequency of the reserved carrier with a local frequency reference signal. This local frequency reference signal has to be relatively stable.

The sign of the relative Doppler tells the mobile if it is moving towards the new base station or away from the new base station.

Furthermore, since all base stations, including the one that the mobile is currently communicating with are transmitting un-modulated sinusoids on reserved frequencies the mobile can also perform some early steps towards synchronisation. Usually the synchronisation is divided into several parts including OFDM symbol synchronisation, frame synchronisation (a frame is assumed to consist of several OFDM symbols) and possibly also super-frame synchronisation (super-frame is assumed to consist of several frames). By detecting the information transmitted on the sub-carriers reserved for un-synchronous communication, the mobile can obtain rough frame synchronisation and super-frame synchronisation. Furthermore, the uncertainty region of the OFDM symbol synchronisation can be reduced. By comparing the detected information on the un-synchronous sub-carriers with the symbols in between that were discarded, an estimate of the OFDM symbol synchronisation error can be obtained. If the detected information symbols on average have much higher received energy than the discarded symbols then the OFDM symbol synchronisation error is large. If, on the other hand, the discarded symbols have almost equally large received energy as the detected symbols, then the OFDM symbol synchronisation is much more accurate. This information can be utilised in the later search of better OFDM symbol synchronisation, in case the mobile is to perform a handover to the new un-synchronised base station. Satisfactory frequency synchronisation to the base station is achieved by locking on to the transmitted un-modulated sinusoid of the reserved frequency.

Thus, one feature is that a sub-set of carriers is reserved for unsynchronised communication, e.g. for cell search. When the mobile terminal detects the presence of such a carrier it will know that it is transmitted from another base station. The mobile can detect this signal even if it is not time synchronised to the base station that transmits it. The frequency of the reserved carrier that the mobile detects is a direct mapping of the cell ID of the base station that transmits the signal.

On these carriers that are reserved for unsynchronised communication it is furthermore possible to transmit also other information to mobiles that are currently time synchronised to another base station. For this to be possible, the carrier frequency reserved e.g. for cell search and broadcasting of information to unsynchronised mobiles should have a modulation format with the following two properties. First, the baud rate of the unsynchronised information must be at most half the original OFDM symbol rate. Secondly, there can be no phase jump allowed between at least every two consecutive OFDM symbols.

A few examples of modulation formats are presented below.

Figure 9:
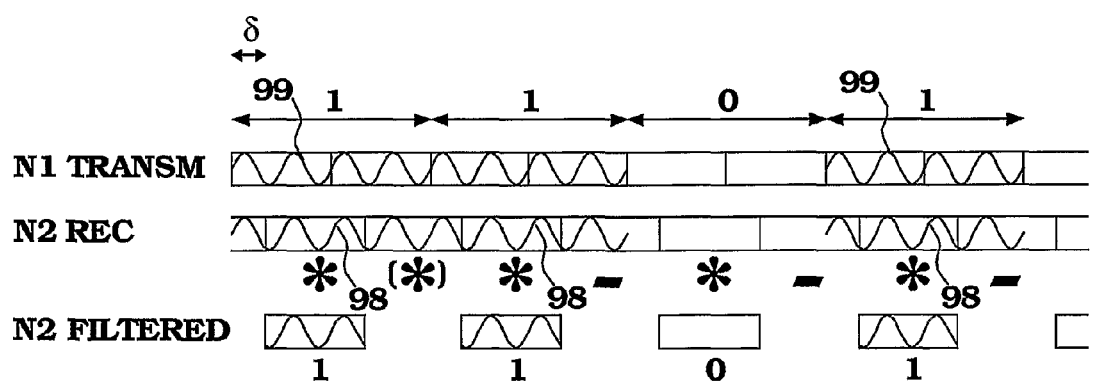
FIGS. 9 and 10 are diagrams illustrating the transmission and reception of sinusoidal signals carrying information between unsynchronised nodes according to example embodiments.

FIG. 9 illustrates an example embodiment of unsynchronised communication. In this figure, the roll-on/roll-off and CP sections are neglected for simplify the reading of the figures. However, these are of course present in analogy with previous figures. In this embodiment, an amplitude modulation is used. In this very embodiment, the amplitude modulation consists of turning the sinusoidal signal 99 on and off, respectively according to certain rules. A transmitting node N1 provides a sinusoidal signal 99 of a frequency corresponding to a reserved carrier. For sending a "1", the node N1 turns on the sinusoidal signal 99 during two consecutive OFDM symbols. For sending a "0", the node N1 turns off the sinusoidal signal 99 during two consecutive OFDM symbols. In the example given in FIG. 9, the node N1 transmits the data sequence "1101", by turning on the sinusoidal signal 99 during 2 times 2 OFDM symbol durations, by turning it off during 2 OFDM symbol durations and finally turning it on again during 2 OFDM symbol durations. Note that there is no phase shift allowed between the first and second OFDM symbol, between the third and fourth OFDM symbol and between the seventh and eighth OFDM symbol. However, if required, there might be a phase shift between the second and third OFDM symbol.

The receiving node N2 records the signals illustrated in the middle row. Pure sinusoidal signals 98 are received in at least every second OFDM symbol. There might also be incidental sinusoidal signals in the intermediate symbols as well, marked with (*). The receiver concludes which set of every second symbol that normally contains rubbish and discards these OFDM symbols. This filtering of received OFDM symbols is illustrated in the bottom line of FIG. 9 and is the explanation of why only at the most half the baud rate can be achieved. The node N2 can now interpret every remaining OFDM "symbol" comprising a sinusoidal signal as a "1" and every empty OFDM "symbol" as a "0". In the example of FIG. 9, the sequence "1101" is detected.

The existence of the base station can still be concluded, except in cases the transmitter continuously transmits zeros. However, in such cases, bit stuffing techniques can be employed to prohibit such situations to occur.

By using sinusoidal signals of a few distinct values each, e.g. 0, ⅓, ⅔ and 1, more data can be transferred simultaneously. The intensity values can then represent "00", "01", "10" and "11", respectively. However, since the absolute path loss is not a priori known, the number of intensity levels that are used must be calibrated and in a typical case very limited in numbers in order to interpret what transmitted intensity an actual received intensity corresponds to. One possible way to calibrate such transmission power levels can be to send a calibration signal comprising a well determined sequence of all used intensity values.

Figure 10:
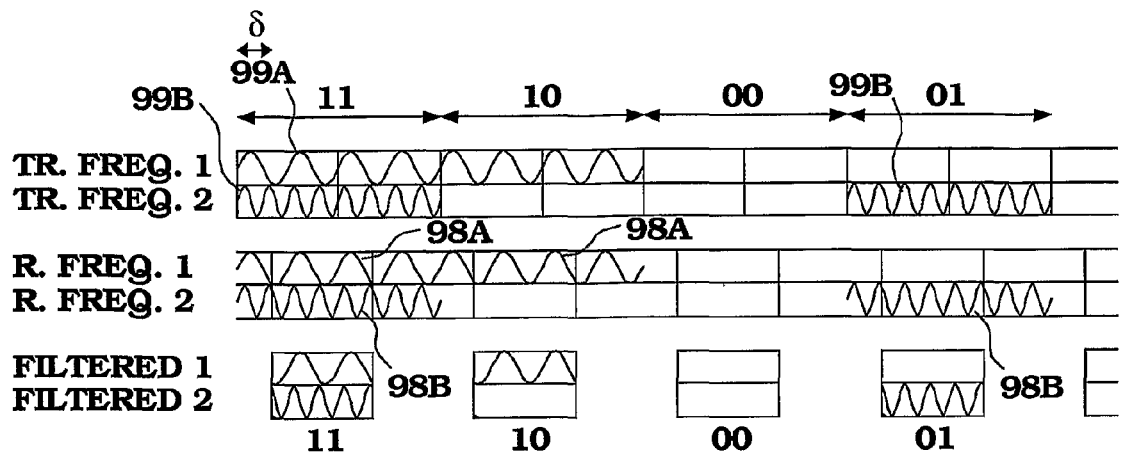

A more attractive way to increase the data transfer rate might perhaps be to combine more than one reserved carrier frequency. In FIG. 10, a transmitter is associated with two frequencies for unsynchronised communication. When the transmitter wants to send the bit sequence "11", both frequencies are allowed to contain a sinusoidal signal 99A, 99B. "10" corresponds to a sinusoidal signal 99A at only one frequency, and "01" corresponds to a sinusoidal signal 99B at only the other frequency. For representing "00", no signals at all are sent. The receiving and filtering procedures are in analogy with earlier embodiments and the receiver will easily interpret the transmitted information.

By increasing the number of available frequencies for each base station, the information rate can be increased. However, since the reservation of carriers for unsynchronised communication decreases the total information transfer, the unsynchronised information rate should be kept as low as possible. Only very important data should be communicated such a way, preferably only data assisting in e.g. handover or paging procedures.

The absolute phase of the sinusoidal signal can not be used for transferring data, since the synchronisation difference δ is not generally known. However, a relative phase can be used, i.e. the data that is transmitted could be differentially encoded. An example of a PSK system is illustrated in FIGS. 11A-C.

Figure 11A:
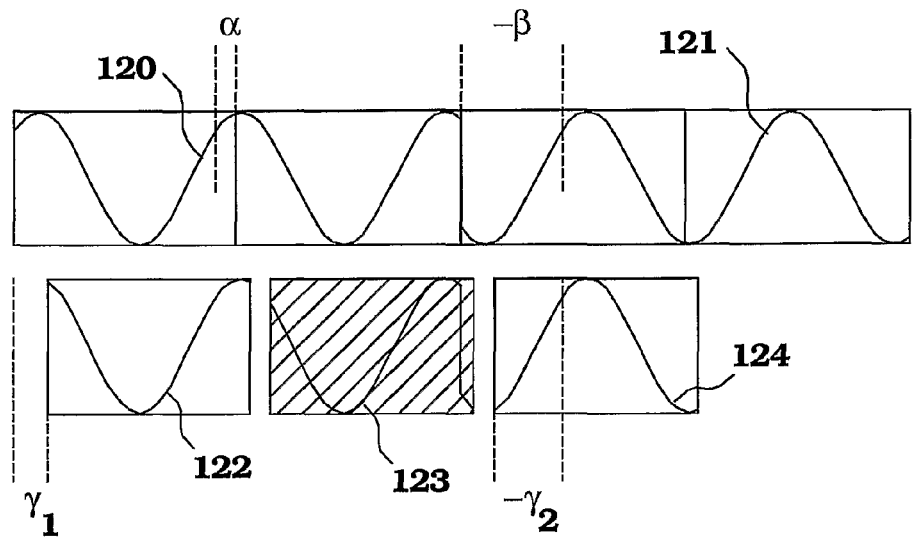
FIG. 11A is a diagram illustrating the communication of phase shift keying information on sinusoidal signals between unsynchronised nodes according to an example embodiment.
Figure 11B:
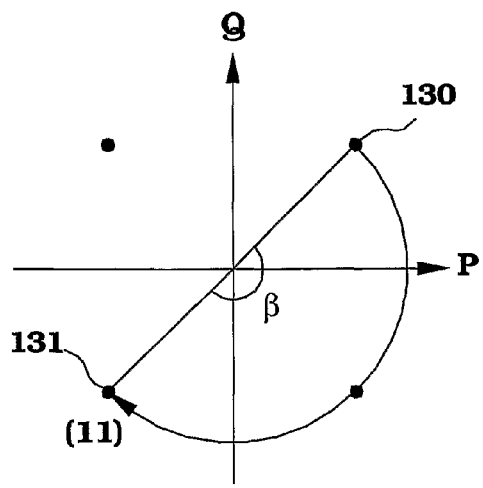
FIGS. 11B and 11C are phase diagram illustrating the communication of FIG. 11A.

First, consider FIG. 11B and the upper part of FIG. 11A. At a transmitter side, A first sinusoidal signal 120 is transmitted during two OFDM symbol intervals. The phase shift of this signal, at the beginning of the first OFDM signal, corresponds to the point 130 in the PQ-diagram. However, due to the roll-on/roll-off and CP intervals, an additional phase shift α is introduced in the second OFDM symbol interval. A second sinusoidal signal 121 is transmitted during the two following OFDM symbol intervals. The relative phase β is to be coded according to information to be transmitted, in this case the bits "11". According to PSK, the phase shift should correspond to the point 131 in the PQ-diagram, i.e. a phase shift of 180°.

Figure 11C:
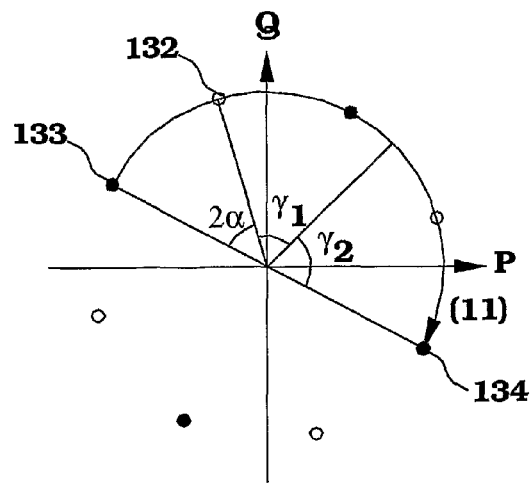

Now, turn to FIG. 11C and the lower part of FIG. 11A. At the receiver side, unsynchronised to the transmitter with a time difference corresponding to a phase difference $\gamma_1$, a sinusoidal signal 122 is received. The phase of the signal 122 corresponds to a point 132 in the PQ-diagram. During the next OFDM symbol interval a second signal 123 is received. However, this signal is not a pure sinusoidal signal and is therefore discarded. In the next OFDM symbol interval, a next sinusoidal signal 124 is received. The phase $-\gamma_2$ of signal 124 corresponds to a point 134 in the PQ-diagram.

It is known that the additional phase shift α, should be introduced twice between the two signals 122 and 124. α is easily deduced from the carrier frequency and time durations of roll-on/roll-off and PC. This is described in detail further below. From this it can be concluded that if no phase shift at all were present at the transmission side between signals 120 and 121, the detected phase of signal 124 would be at point 133 in the PQ-diagram. The introduced relative shift can thus easily be calculated as:

$$\beta = \gamma_1 + \gamma_2 + 2\alpha,$$

in this case 180 degrees. Such a phase shift corresponds to the binary data values "11".

The phase rotation α on a carrier performing n complete rotations during the useful OFDM signal can be expressed as:

$$\alpha = -2\pi\left(\frac{n}{N_{fft}}(N_{roll} + N_{cp}) - \left\lfloor\frac{n}{N_{fft}}(N_{roll} + N_{cp})\right\rfloor\right),$$

where $\lfloor x \rfloor$ denotes the largest integer smaller than or equal to x.

Figure 12A:
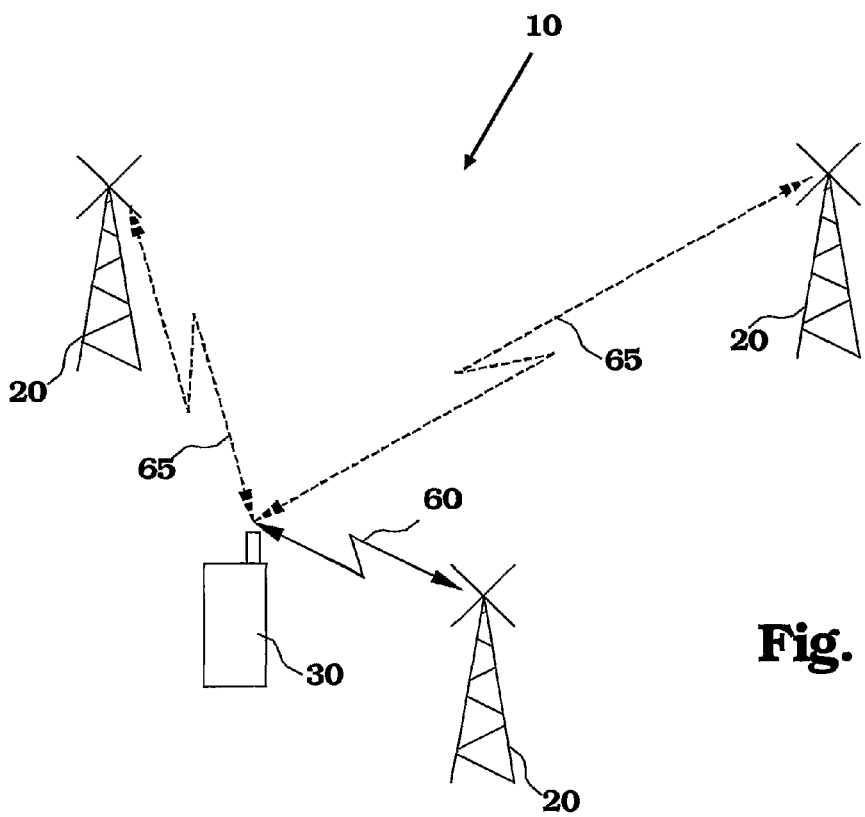
FIGS. 12A-C are schematic illustrations of unsynchronised communication in a communication network.

The technology in this case can be applied for unsynchronised communication in all kinds of OFDM systems. Such communication is of particular interest in certain situations in cellular communication. One situation is for cell search in a handover procedure. FIG. 12A illustrates a communications system, where three base stations 20 are within radio communication distance with a mobile terminal 30. The mobile terminal is connected and synchronised to the closest base station by an active link 60. However, in order to assist at handover, the mobile terminal 30 continuously or quasi-continuously searches for neighbour base stations. Such communication has to be performed over unsynchronised links 65. The information that is of particular interest during an initial search stage is first of all the existence of neighbor base stations, and further information like e.g. the cell load in other base stations. This information is relevant when taking any decision that a handover procedure should be initiated. When the actual decision to make a handover is taken, further information is of interest. Information about which random access resources are available in other cells becomes important, as well as a ruff idea of the frame synchronisation in the cells selected for handover. A synchronisation message can for instance be transmitted as a special broadcast information on the reserved carriers.

Figure 12B:
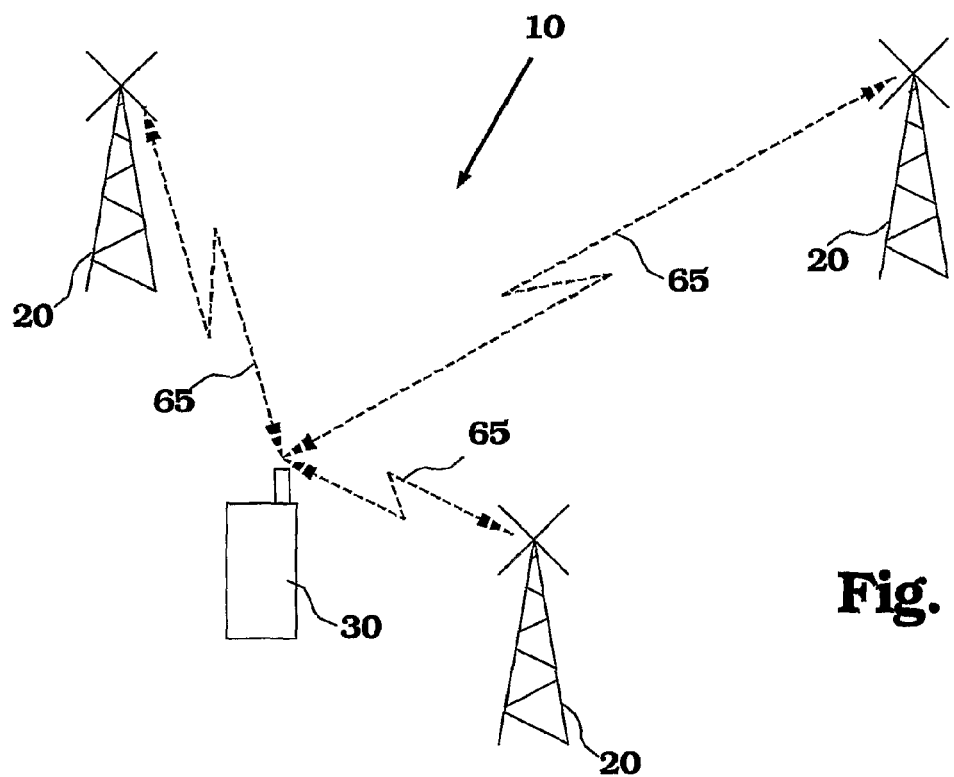

FIG. 12B illustrates another situation. Here, the mobile terminal 30 is not synchronised to any base station 20. This could e.g. be the situation when the mobile terminal 30 is turned on and starts to find any communications network to communicate with. In such a situation, the mobile terminal 30 has its own internal synchronisation and all communication with base stations in the vicinity has to be performed via unsynchronised messages in an initial phase. This situation is very demanding in prior art in terms of processing capacity, battery power and time. However, if some initial assisting information, such as a ruff frame synchronisation or an available random access resource can be derived, this reduces these demands considerably.

The situation in FIG. 12B could also illustrate the situation, in which the mobile terminal 30 is connected to the communications system in idle mode. The mobile terminal 30 is then not synchronised with any particular base station 20, but the base stations 20 know that the mobile terminal 30 a short while ago was present within their coverage area. If an incoming call to the mobile terminal arrives at the communications network, a paging is performed, in order to determine where the mobile terminal 30 is situated. Such a paging message can with advantage be broadcast using a carrier intended for unsynchronised communication according to the present invention.

Furthermore, unsynchronised communication should also be possible to perform e.g. between two base stations, e.g. for exchanging resource management information over the air.

Figure 12C:
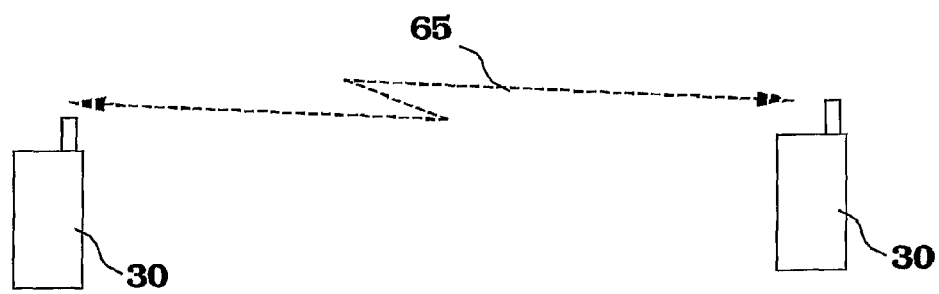

Unsynchronised communication is also possible to perform directly between mobile terminals 30, as illustrated in FIG. 12C. In such a situation, there is probably no pre-defined relation between the carrier frequency that is used and the particular device. Here, either a carrier commonly assigned for such communication has to be used, or if the mobile terminals 30 are presently connected to any network, the network or networks could assist in temporarily assigning such a carrier frequency to the communication.

Figures 13, 14:
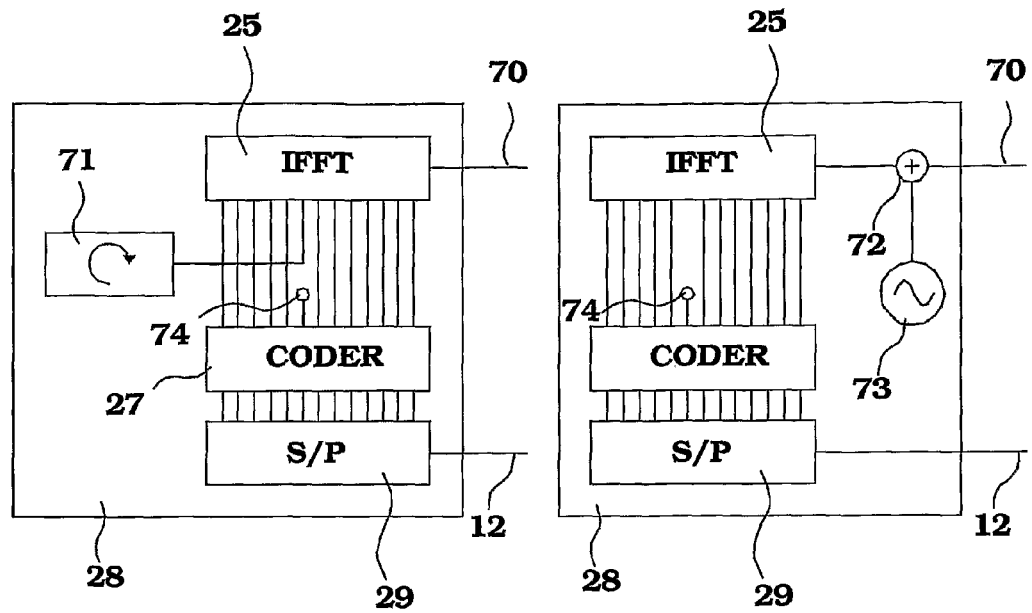
FIGS. 13 and 14 are block diagrams of transmitters according to example embodiments.

A constant sinusoidal signal can be generated by an OFDM transmitter in different ways. One embodiment is illustrated in FIG. 13. Here, the signal processor 28 of a transmitter is shown in more detail. In this embodiment, one carrier is reserved for unsynchronised communication from this particular transmitter. Instead of feeding the IFFT 25 by a value from the encoder, a data symbol generator 71 supplies a value intended for this particular carrier. A terminator means 74 terminates any signals on the reserved carrier provided from the encoder. On such carriers that rotate an integer number of times during the roll-on, the roll-off, and the cyclic prefix durations a constant data symbol can be transmitted from the symbol generator 71. However, a constant sinus can be transmitted on any carrier by continuously rotating the data symbol on that carrier to compensate for the phase rotations during the cyclic prefix and the roll on/off. If the symbol generator 71 transmits the same data symbol in two consecutive OFDM symbols and rotates the second data symbol in order to compensate for the phase shift $\alpha$ in the cyclic prefix and in the roll-on and roll-off, then there will be a sinusoidal signal, which lasts for at least two OFDM symbol durations. The phase shift $\alpha$ is easily calculated as discussed further above. If the sinusoidal signal is to carry information modulated as well, the symbol generator 71 is controlled accordingly, e.g. by being switched on and off or by introducing further phase shifts, according to the discussions further above. The resulting signal is provided on a signal processor output 70.

Alternatively, as illustrated in FIG. 14, a carrier in the IFFT can be switched off and a sinusoidal signal of the corresponding frequency can simply be added 72 in the time domain by a signal generator 73. Also here, if the sinusoidal signal is to carry information modulated as well, the signal generator 73 is controlled accordingly, e.g. by being switched on and off or by introducing further phase shifts, according to the discussions further above.

Figures 15, 16:
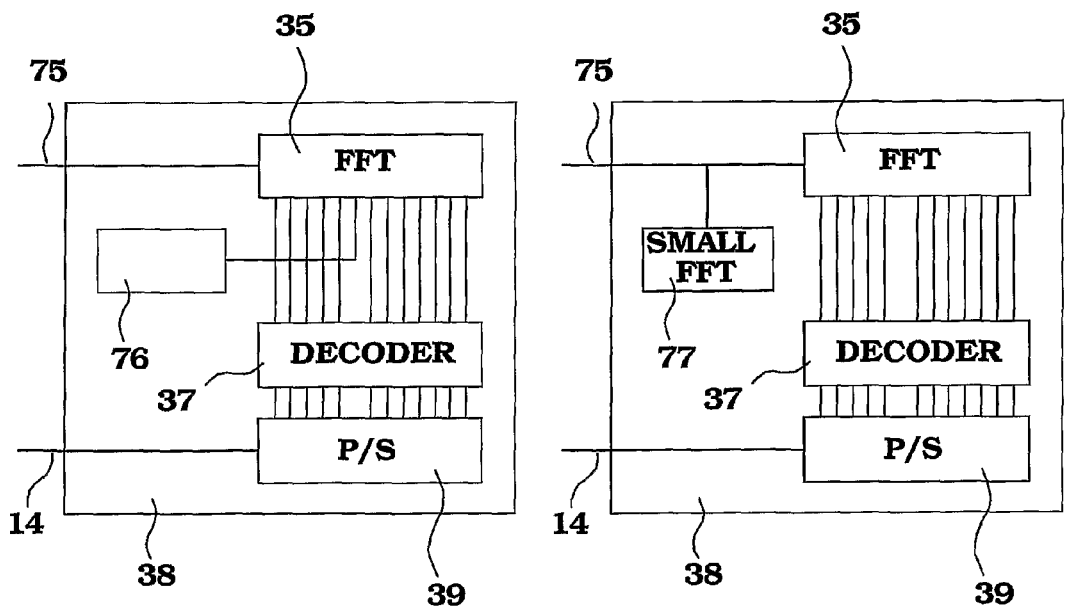
FIGS. 15 and 16 are block diagrams of receivers according to example embodiments.

A signal processor in a receiver according to an embodiment of the present invention can look like the one illustrated in FIG. 15. An input signal is received at a signal processor input 75. After the FFT 35, one (or in general several) of the transformed values is not allowed to reach the decoder 37. Instead a symbol interpreter 76 is introduced. In this symbol interpreter, any procedure connected to the reception of unsynchronised OFDM communication is performed, according to the discussions above.

FIG. 16 illustrates an alternative embodiment of a receiver signal processor. In this case, the reserved carrier is simply terminated at the FFT 35 or at the connection to the decoder 37. Instead a second (smaller) FFT 77 is connected directly to the input 75, experiencing the same signal as the main FFT 35. The second FFT 77 is then preferably arranged to only select a few frequencies to analyse. Such small FFT 77 can be designed to be much simpler than the main FFT 35, which doesn't add any significant costs to the entire signal processor 38. Instead, the operation of the small FFT 35 requires less time and less processor power and therefore also less battery power. Particularly cheap and simple FFTs can be achieved if the reserved carriers are selected equidistant in frequency, as mentioned further above.

In FIGS. 13-16, the encoder and decoder, respectively, are illustrated as units operating in parallel on several data. However, anyone skilled in the art realises that the encoder/decoder can change position with the parallel-to serial and serial-to-parallel converters, respectively. In such a case, the decoding/encoding is performed on serial data. The terminator means 74 can then be placed on either side of the serial-to-parallel converter 29 at the transmitter, and symbol interpreter 76 can be placed before or after the parallel-to-serial converter 39 at the receiver side.

Figure 17:
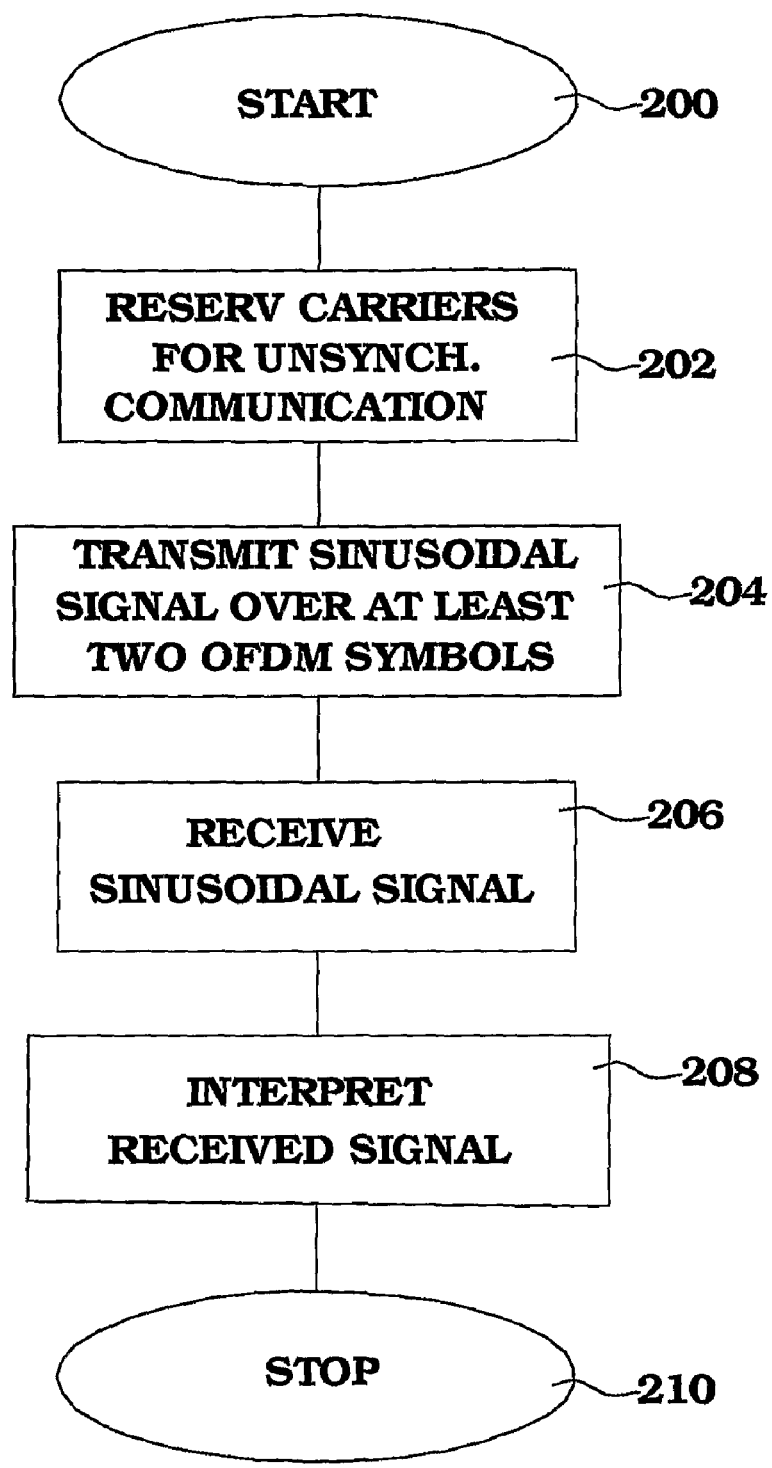
FIG. 17 is a flow diagram illustrating the main steps in an example embodiment of a method according to the described technology.

An example method is described referring to a flow diagram of FIG. 17. The procedure starts in step 200. In step 202, a number of carriers of an OFDM system are reserved for unsynchronised communication. In step 204, a sinusoidal signal is transmitted at such a reserved carrier over a time period corresponding to at least two consecutive OFDM symbols. The sinusoidal signal is received in step 206 and interpreted in step 208. The procedure ends in step 210.

Sinusoidal signals have earlier been proposed as a tool for facilitate synchronisation with a particular base station, see e.g. "Pilot assisted synchronization for wireless OFDM systems over fast time varying fading signals" by S. Kapoor et. al., VTC'98, 48th IEEE Vehicular Technology Conference, Ottawa, Canada, May 18-21, 1998, IEEE Vehicular Technology Conference, New York, USA, Vol. 3 Conf. 48, pp. 2077-2080, XP000903385. However, using continuous sinusoidal signals for identification purposes and data communication between unsynchronised nodes has never been proposed in prior art.

It will be understood by those skilled in the art that various modifications and changes may be made to the exemplary embodiments of the present disclosure without departing from the scope of the present invention, which is solely defined by the appended claims.

The Invention claimed is:

1. A method for communication between unsynchronized nodes in a multi-carrier system, utilizing a set of carriers and having a predetermined symbol length,
   the method comprising the steps of:
      reserving a sub-set of carriers for communication between unsynchronized nodes,
      at least one respective carrier of said sub-set of carriers being assigned to nodes in the multi-carrier system to create a relation between node identity of said nodes and said at least one carrier;
      transmitting from a first node a phase-continuous sinusoidal signal on said at least one carrier of the sub-set of carriers assigned to the first node during a predetermined transmission period,
      the predetermined transmission period corresponding to the duration of n consecutive ones of the predetermined symbol length, where n is an integer larger than 1,
      receiving the transmitted sinusoidal signal in a second node that is unsynchronized with the first node; and
      the second node interpreting the received sinusoidal signal including associating at least a frequency of the received sinusoidal signal with information about the identity of the first node from which the existence of the first node within radio communication distance is determined even though the second node is unsynchronized with the first node.

2. Method according to claim 1, wherein the step of interpreting the received sinusoidal signal comprises the further steps of:
deriving a relative Doppler as a frequency difference between the received sinusoidal signal and an expected frequency associated to the first node; and
associating the relative Doppler to a velocity component of the second node in the direction of the first node.

3. Method according to claim 2, wherein the step of interpreting the received sinusoidal signal comprises the steps of:
associating a sign of the relative Doppler to information about if the second node moves towards or away from the first node.

4. Method according to claim 1, wherein the step of interpreting the received sinusoidal signal comprises the steps of:
deriving a relative path loss as an averaged received signal strength compared with a transmission strength of the first node; and
associating the relative path loss to an estimate of the distance between the first and second nodes.

5. Method according to claim 1, comprising the further steps of:
altering characteristics of the sinusoidal signal in the first node between consecutive ones of the predetermined transmission periods in accordance with a coding of data to be sent between unsynchronized nodes;
decoding the received sinusoidal signal in the second node to obtain the sent data.

6. Method according to claim 5, wherein the decoding is performed on every n:th received symbol.

7. Method according to claim 6, wherein the coding involves an amplitude change between the sinusoidal signal of two consecutive ones of the predetermined transmission periods.

8. Method according to claim 7, wherein the coding involves switching off and switching on, respectively, the sinusoidal signal of two consecutive ones of the predetermined transmission periods.

9. Method according to claim 6, wherein the coding involves a phase shift between the sinusoidal signal of two consecutive ones of the predetermined transmission periods.

10. Method according to claim 5, wherein a sinusoidal signal is transmitted on at least two carriers of the predetermined sub-set of carriers, whereby the coding of data to be sent between unsynchronized nodes utilises the at least two carriers of the predetermined sub-set of carriers.

11. Method according to claim 10, wherein the coding of data to be sent between unsynchronized nodes utilises time differences between the onset of the sinusoidal signal of at least two of the at least two carriers of the predetermined sub-set of carriers.

12. Method according to claim 1, wherein the first node is a base station and the second node is a mobile terminal.

13. Method according to claim 12, wherein the data to be sent between unsynchronized nodes comprises data assisting in procedures of changing base station.

14. Method according to claim 12, wherein the data to be sent between unsynchronized nodes comprises data assisting in paging procedures.

15. Method according to claim 12, wherein the data to be sent between unsynchronized nodes comprises data selected from the list of:
load indication; and
possible random access channels.

16. Method according to claim 1, wherein both the first node and the second node are base stations, whereby the data to be sent between unsynchronized nodes comprises data assisting in procedures of synchronizing base stations.

17. Method according to claim 1, wherein both the first node and the second node are mobile terminals.

18. Method according to claim 1, wherein the carriers of the sub-set of carriers reserved for communication between unsynchronized nodes are distributed over the frequency band of the set of carriers.

19. Method according to claim 1, wherein the carriers of the sub-set of carriers reserved for communication between unsynchronized nodes are equidistant in frequency.

20. Method according to claim 1, wherein the multi-carrier system is a orthogonal frequency division multiplexing system.

21. A multi-carrier wireless-communication system node, comprising:
a signal processor arranged to provide signals having a predetermined symbol length on a set of carriers; and
a transmitter arranged to transmit the signals provided by the signal processor,
a predetermined sub-set of carriers being reserved for communication between unsynchronized nodes,
at least one respective carrier of said sub-set of carriers being assigned to nodes in the multi-carrier system,
whereby a relation between node identity of said nodes and said at least one carrier being created,
the signal processor being further arranged to provide a sinusoidal signal, being phase-continuous, on said at least carrier assigned to the node during a predetermined transmission period of n times the predetermined symbol length, where n is an integer larger than 1,
wherein the signal processor is arranged to:
perform for inverse Fourier transform operations,
switch off outputs from an encoder corresponding to the predetermined sub-set of carriers,
provide a sinusoidal signal corresponding to a carrier in the predetermined sub-set of carriers being associated with the node, and
add the output signals from the sinusoidal signal and inverse Fourier transform signals.

22. A multi-carrier wireless-communication system node, comprising:
a signal processor arranged to provide signals having a predetermined symbol length on a set of carriers; and
a transmitter arranged to transmit the signals provided by the signal processor,
a predetermined sub-set of carriers being reserved for communication between unsynchronised unsynchronized nodes,
at least one respective carrier of said sub-set of carriers being assigned to nodes in the multi-carrier system,
whereby a relation between node identity of said nodes and said at least one carrier being created,
the signal processor being further arranged to provide a sinusoidal signal, being phase-continuous, on said at least carrier assigned to the node during a predetermined transmission period of n times the predetermined symbol length, where n is an integer larger than 1,
wherein the signal processor further comprises:
means for switching off outputs from an encoder corresponding to carriers of the predetermined sub-set of carriers not being associated with the node; and
means for providing a rotation of the data symbol of the input to the means for inverse Fourier transform corresponding to carriers of the predetermined sub-set of carriers not being associated with the node, the rotation compensating for a phase rotation during cyclic prefix and roll on/off periods for the carrier in question.

23. A multi-carrier wireless-communication system receiver node, comprising:
- a receiver arranged to receive signals having a predetermined symbol length on a set of carriers; and
- a signal processor arranged to process the signals provided by the receiver, the signal processor being further arranged to:
- detect an existence of a phase-continuous sinusoidal signal on at least one of a predetermined sub-set of carriers received from a transmitter node with which the receiver node is unsynchronized,
- the predetermined sub-set of carriers being reserved for communication between unsynchronized nodes,
- the at least one respective carrier of said sub-set of carriers being assigned to the transmitter node in the multi-carrier system,
- wherein there is an established relationship between a node identity of said transmitter node and said at least one carrier; and
- interpret at least a frequency of the received sinusoidal signal as information about the identity of the transmitter node transmitting the received sinusoidal signal even though the receiver node is unsynchronized with the transmitter node.

24. Node according to claim 23, wherein the signal processor comprises means for Fourier transform.

25. Node according to claim 24, wherein the signal processor comprises means for detecting intensity on any output from the means for Fourier transform corresponding to the predetermined sub-set of carriers.

26. Node according to claim 23, wherein the multi-carrier system is a orthogonal frequency division multiplexing system.

27. Node according to claim 23, wherein the node is a base station.

28. Node according to claim 23, wherein the node is a mobile terminal.

29. A wireless communications system having a node corresponding to the node in claim 21.

30. A wireless communications system having a node corresponding to the node in claim 21.

31. A method for communication between nodes in a multi-carrier system, utilizing a set of carriers and having a predetermined symbol length,
the method comprising the steps of:
- reserving a sub-set of carriers for communication between unsynchronized nodes,
- at least one respective carrier of said sub-set of carriers being assigned to nodes in the multi-carrier system to create a relation between node identity of said nodes and said at least one carrier;
- transmitting a sinusoidal signal, being phase-continuous, on said at least one carrier of the sub-set of carriers for a first node during a predetermined transmission period,
- the predetermined transmission period corresponding to the duration of n consecutive ones of the predetermined symbol length, where n is an integer larger than 1,
- receiving the transmitted sinusoidal signal in a second node; and
- interpreting the received sinusoidal signal, in turn comprising associating at least a frequency of the received sinusoidal signal with information about the identity of the first node,
- whereby the existence of the first node within radio communication distance is concluded, wherein the step of interpreting the received sinusoidal signal comprises the further steps of:
- deriving a relative Doppler as a frequency difference between the received sinusoidal signal and an expected frequency associated to the first node;
- associating the relative Doppler to a velocity component of the second node in the direction of the first node; and
- associating a sign of the relative Doppler to information about if the second node moves towards or away from the first node.

32. A method for communication between nodes in a multi-carrier system, utilizing a set of carriers and having a predetermined symbol length,
the method comprising the steps of:
- reserving a sub-set of carriers for communication between unsynchronized nodes,
- at least one respective carrier of said sub-set of carriers being assigned to nodes in the multi-carrier system to create a relation between node identity of said nodes and said at least one carrier;
- transmitting a sinusoidal signal, being phase-continuous, on said at least one carrier of the sub-set of carriers for a first node during a predetermined transmission period,
- the predetermined transmission period corresponding to the duration of n consecutive ones of the predetermined symbol length, where n is an integer larger than 1,
- receiving the transmitted sinusoidal signal in a second node; and
- interpreting the received sinusoidal signal, in turn comprising associating at least a frequency of the received sinusoidal signal with information about the identity of the first node, whereby the existence of the first node within radio communication distance is concluded,
wherein the step of interpreting the received sinusoidal signal comprises the further steps of:
- deriving a relative path loss as an averaged received signal strength compared with a transmission strength of the first node; and
- associating the relative path loss to an estimate of the distance between the first and second nodes.

33. The node according to claim 23, wherein the signal processor is further arranged to:
- derive a relative Doppler as a frequency difference between the received sinusoidal signal and an expected frequency associated to the first node;
- associate the relative Doppler to a velocity component of the second node in the direction of the first node; and
- associate a sign of the relative Doppler to information about if the second node moves towards or away from the first node.

34. The node according to claim 23, wherein the signal processor is further arranged to:
- derive a relative path loss as an averaged received signal strength compared with a transmission strength of the first node; and
- associate the relative path loss to an estimate of the distance between the first and second nodes.

* * * * *

UNITED STATES PATENT AND TRADEMARK OFFICE
CERTIFICATE OF CORRECTION

PATENT NO. : 7,616,556 B2 Page 1 of 1
APPLICATION NO. : 10/581995
DATED : November 10, 2009
INVENTOR(S) : Nyström et al.

It is certified that error appears in the above-identified patent and that said Letters Patent is hereby corrected as shown below:

Title Page, Item (75), under "Inventors", delete "Vällinby" and insert -- Vällingby --, therefor.

In Column 1, Line 7, delete "Dec." and insert -- Dec., --, therefor.

In Column 1, Line 9, delete "Dec." and insert -- Dec., --, therefor.

In Column 1, Line 48, delete "can not" and insert -- cannot --, therefor.

In Column 8, Line 30, delete "simplify" and insert -- simplifying --, therefor.

In Column 9, Line 60, delete "-$\gamma_2$" and insert -- $\gamma_2$ --, therefor.

In Column 14, Line 49, in Claim 22, before "unsynchronized", delete "unsynchronised".

Signed and Sealed this

Eighteenth Day of May, 2010

David J. Kappos
*Director of the United States Patent and Trademark Office*